July 21, 1925.
A. A. WEST
HANGING SEAT
Filed Aug. 30, 1923
1,546,768
4 Sheets-Sheet 2
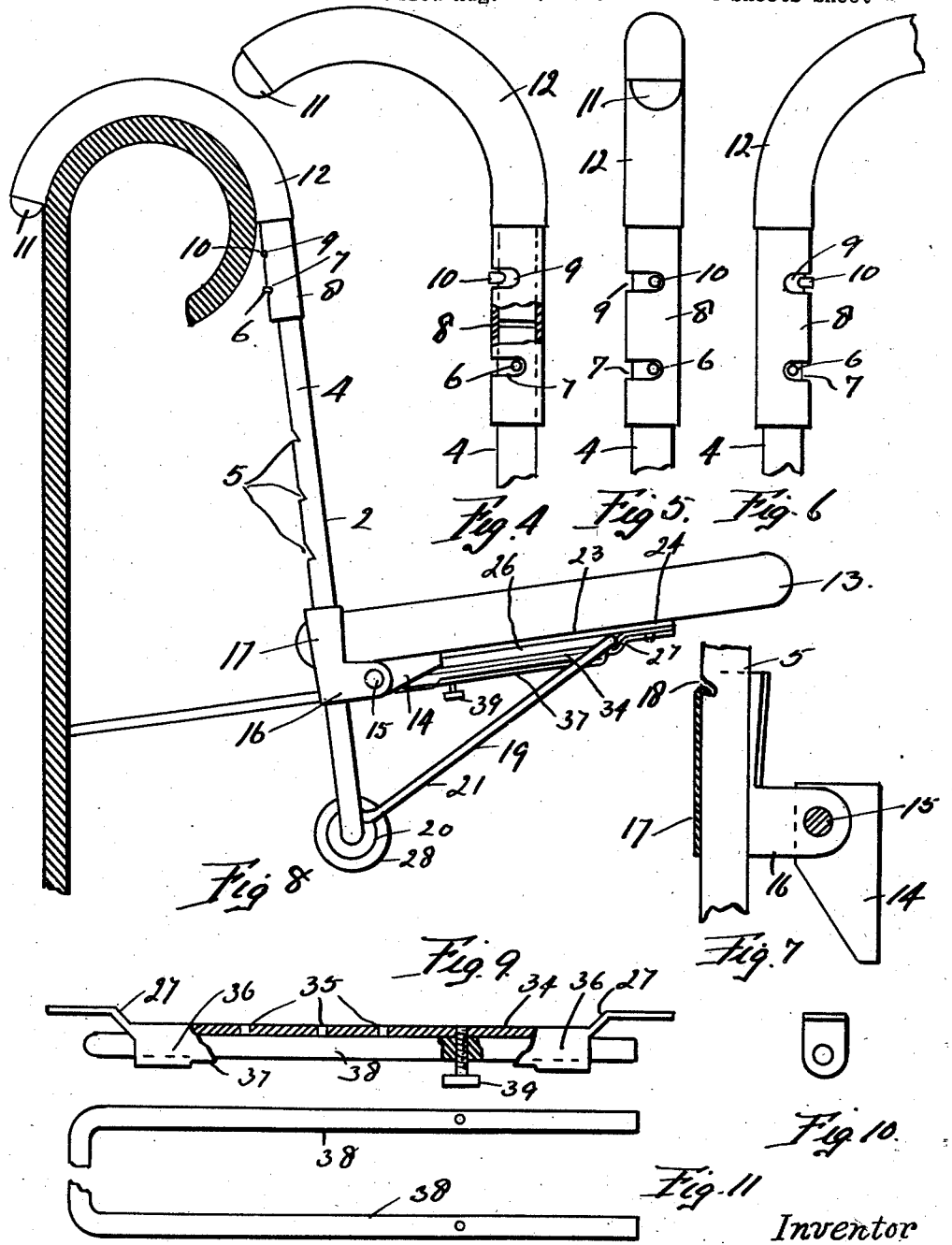
Inventor
Augustus Albert West
By
W. W. Williamson
Atty.

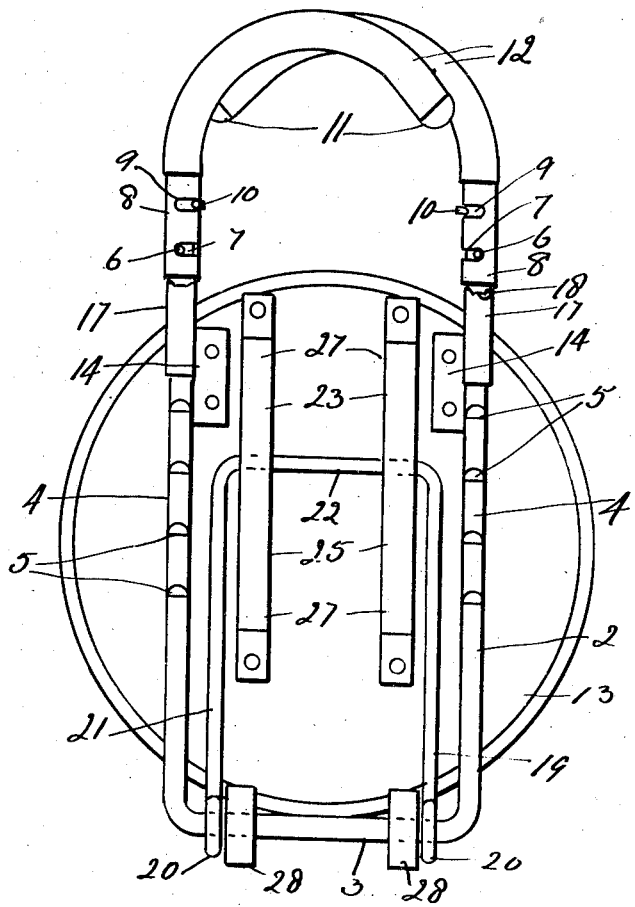
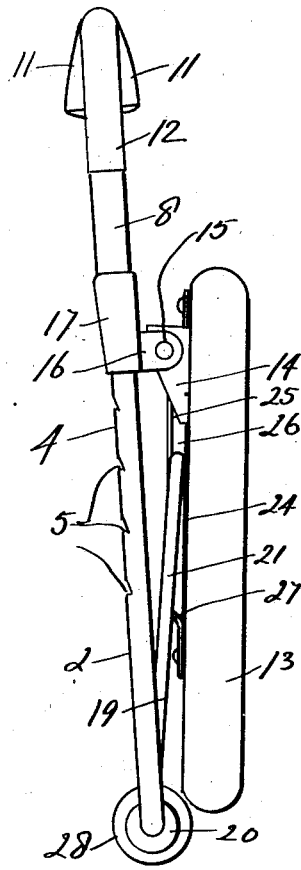
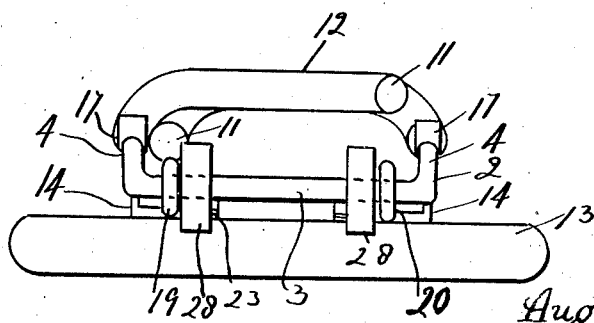

July 21, 1925.

A. A. WEST 1,546,768

HANGING SEAT

Filed Aug. 30, 1923

Inventor
Augustus Albert West
By W. W. Williamson
Atty.

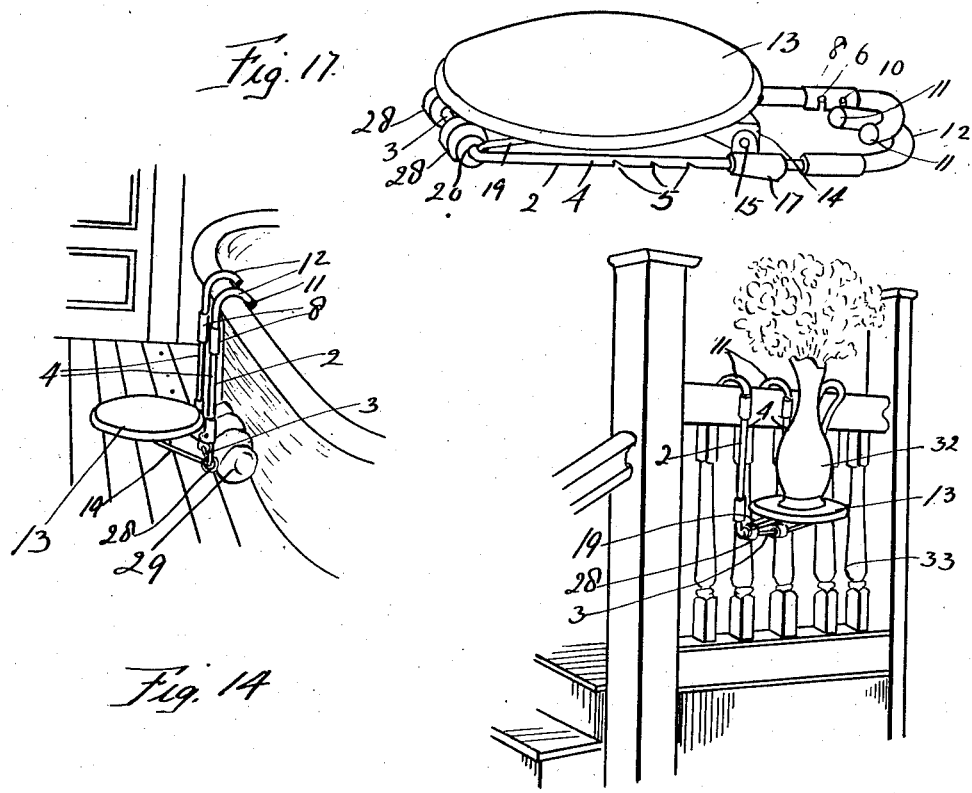
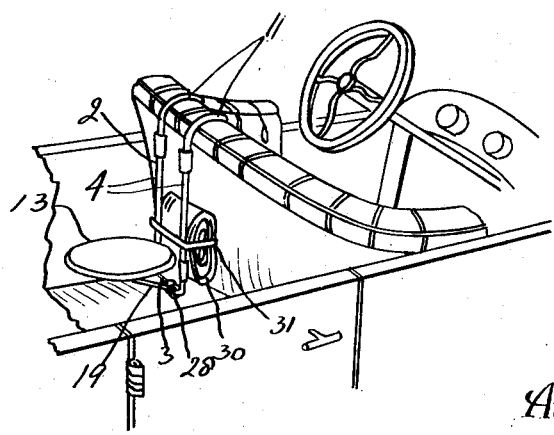

Patented July 21, 1925.

1,546,768

UNITED STATES PATENT OFFICE.

AUGUSTUS ALBERT WEST, OF PHILADELPHIA, PENNSYLVANIA.

HANGING SEAT.

Application filed August 30, 1923. Serial No. 660,084.

*To all whom it may concern:*

Be it known that I, AUGUSTUS ALBERT WEST, a citizen of the United States, residing at Philadelphia, in the county of Philadelphia and State of Pennsylvania, have invented new and useful Improvements in a Hanging Seat, of which the following is a specification.

My invention relates to new and useful improvements in hanging seats which are generally known as bathtub seats and particularly refers to improvements on the structure illustrated and described in my Patent No. 1,371,715, dated March 15th, 1921.

The principal object of my invention is to provide adjustable arm ends or hooks whereby they may be adjusted to any position within a semi-circle or caused to swing 180 degrees. Such an arrangement enables the device to be folded compactly for shipment in a small parcel or storage in little space and permits the device to be hung on a curved surface or in a corner where two walls of the supporting device set at angles to each other.

Another object of this invention is to provide means for holding the seat at a distance from the support to maintain the seat member in a substantially horizontal position where the support is backwardly inclined or said support has an overhanging ledge.

A further object of this invention is to provide buffers adjustably mounted on the cross bar of the arms for contact with the face of the support to prevent damage thereto. By making said buffers adjustable they can be positioned so as to hold the seat in a straighter position on an uneven surface.

This hanging seat although particularly adapted for use as a bathtub seat is suitable for use as an extra detachable automobile seat, a supplemental seat for barbers' chairs, a hanging shelf and the like.

An advantage of the device constructed as hereinafter described is that it may be adjusted to accommodate it to different kinds and shapes of supports.

Other advantages and objects will be apparent from the following description and by reference to the different figures in the drawings.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a bottom plan view of a hanging seat embodying my invention illustrated in a folded condition.

Fig. 2, is an edge view thereof.

Fig. 3, is an end view of Fig. 1.

Fig. 4, is a slightly enlarged fragmentary sectional elevation of one of the arms in one position.

Fig. 5, is an elevation of the part shown in Fig. 4, in another position.

Fig. 6, is a similar view in still another position, the outer end of the hook being broken away.

Fig. 7, is a detail sectional elevation of the slide lock.

Fig. 8, is a side elevation of a seat employing an adjustable rest to hold the seat member away from the support, the latter being here illustrated as a bathtub, a section of which is shown.

Fig. 9, is an enlarged sectional side elevation of the adjustable rest.

Fig. 10, is an end view of the rest housing.

Fig. 11, is a broken plan view of the rest tongue.

Fig. 14, is a picture of a bath room illustrating the use of the seat on the outside of the tub.

Fig. 15, is a picture of a balustrade with the hanging seat installed as a shelf.

Fig. 16, is a picture illustrating the device used as an extra seat in an automobile.

Fig. 17, is a top perspective view of the seat folded for packing and storage purposes.

Figure 12:
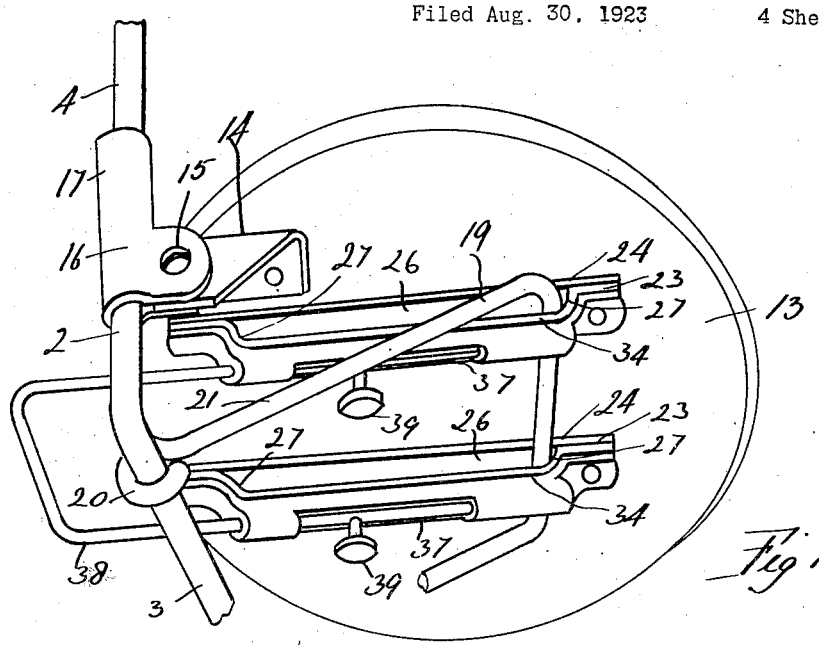
Fig. 12, is a fragmentary bottom perspective view of the hanging seat provided with adjustable rests.

In carrying out my invention as herein embodied, 2 represents a hanger preferably made from a section of rod bent to substantially U shape to form a cross bar 3 and a pair of parallel arms 4 each of which is provided with a plurality of spaced notches 5. Adjacent the upper or free end of each arm is fixed a pin 6 to register with a transverse slot 7 in the rotatable sleeve 8 which also has another transverse slot 9 parallel with and equal to the other slot but spaced therefrom. Into this last named slot projects a pin 10 fixed to the inner end of a hook 11 rotatably mounted in each sleeve. As will be obvious from Figs. 4 to 6 inclusive when a hook is in its extreme left position as in Fig. 4 and it is desired to move it to the other extreme as in Fig. 6, the hook is turned to the intermediate position, Fig. 5, by swinging it so that the pin 10 will travel in the slot 9 until said pin reaches an end of said slot 9 at which time the pin 10 will cause the sleeve 8 to rotate on the arm and with the hook within the limits of the slot 7 permitting said hook to be turned to the extreme right position as in Fig. 6. The above movement of the hook equals substantially 180 degrees and is accomplished through the two slots each extending substantially 90 degrees around the circumference of the sleeve. The movement can be increased or diminished by lengthening or shortening the slots. Such an arrangement provides the necessary or desired movement of the hooks without materially weakening the parts which would occur if a single slot of 180 degrees was formed in the sleeve.

The hooks, or those portions which engage a support, are encased in protective jackets 12 of suitable material, such as rubber, and preferably comprise sections of rubber tubing.

The seat member 13, which is preferably wood and enameled, may be of any desirable shape or configuration and has two brackets 14 secured to the underside thereof. To these brackets are pivoted, as at 15, the ears 16 of the flaring tube-like slide locks 17. Said slide locks may be produced from strips of sheet metal bent to shape so that the ear of each includes two parallel plates, one engaging each side of a coacting bracket. The flare of the slide locks is toward the upper ends and preferably at the extreme upper ends lips 18 are formed by bending or crimping the edges inward as plainly shown in Fig. 7. The slide locks are slidable on the arms of the hanger 2 so that the lips 18 may engage the different notches 5 to assist in holding the seat member in different adjusted positions as will be presently described.

On the cross bar 3 of the hanger 2 is journalled the brace 19 by means of eyes 20 formed on the ends of the brace arms 21. The brace is also preferably formed from a section of rod bent substantially U-shape so as to provide a cross piece 22 in addition to the arms and eyes above mentioned. The cross piece of the brace is slidably retained in the guides 23 secured to the underside of the seat member in parallelism and each guide consists of a flat strip 24 lying directly against the bottom face of the seat member and on this strip 24 is superimposed the coacting strip 25 having inwardly bent ends which engage the ends of the strip 24 leaving the intermediate portions of the strips spaced apart to provide a guideway 26 with a stop 27 at each end of the guideway. The cross piece of the brace is movable within the guideway and is limited in its movements by the stops 27.

On the cross bar 3 of the hanger are slidably mounted the buffers 28 which are preferably large rubber washers and these are adapted to engage the surface of the support on which the seat is hung and being slidable they may be adjusted to engage those portions of the surface having approximately the same elevation where the surface of the support is uneven thus maintaining the seat in a more level position.

Figure 13:
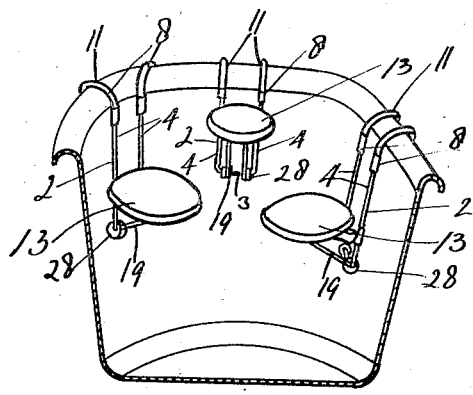
Fig. 13, is a picture of a section of a bathtub showing different ways the hanging seat may be used.

The hook being adjustable the seat may be placed in the corner of a bathtub, or other supporting device, with one hook engaging a side and the other an end wall as illustrated at the right of Fig. 13 or the seat may be hung on the side or end walls as shown at the right and in the center respectively of Fig. 13. As the end wall of a bathtub usually is inclined more than the side wall when the device is used on an end wall the slide locks must be raised a greater height than when the device is used on the side wall in order to make the seat member level.

When the seat is in use the slide locks are adjusted on the hanger arms until the lips of said slide locks engage the desired notches, then the brace 19 is moved outward, relative to the free end of the seat member, until its cross piece engages the stops at the outer ends of the guides thus supporting the seat member and any weight upon the seat member tends to force the lips of the slide locks into the notches and the brace against the stop thereby preventing accidental collapse of the seat member.

As illustrated in Figs. 14 and 16 the device may be used on the outside of the bathtub or as an extra seat in an automobile but in either case if the face of the supporting object recedes an article, such as a towel 29, Fig. 14 or a blanket 30, Fig. 16 must be placed between the hanger and the face of the support. If found desirable the article may be fastened to the hanger by a suitable fastener such, as for instance, a strap 31.

The device may also be used as a shelf for holding such as, for instance, a flower vase 32, Fig. 15 or other decorative article by hanging said device on a support such as a balustrade 33.

As shown in Fig. 17 the hanging seat may be folded compactly for storage, shipment or hanging upon a nail or its equivalent when the two hooks are turned toward each other.

In order to provide for properly holding the seat member in relation to a support having a receding surface as illustrated in Figs. 14 and 16 without the use of towels, blankets or such articles I substitute for the superimposed strips 25 of the guides, other strips 34, Figs. 8 to 12 inclusive, provided with spaced holes 35 and carrying rest housings 36 open at the ends and having longitudinal slots 37. In the housings are slidably mounted the arms of the U-shaped rest tongue 38, said arms having set screws 39 threaded through them and lying in the slots. After the rest tongue is properly adjusted the set screws are screwed in far enough to project their inner ends into certain of the holes 35 to maintain the adjustment.

In use the rest tongue will engage the receding surface of the support to hold the seat member in any desirable position as illustrated in Fig. 8.

Of course I do not wish to be limited to the exact details of construction as herein shown as these may be varied within the limits of the appended claims without departing from the spirit of my invention.

Having thus fully described my invention, what I claim as new and useful is:—

1. A hanging seat comprising a hanger including two arms, a pin at the upper end of each arm, a sleeve having a pair of parallel slots rotatably mounted upon each arm with the pins thereof permanently registering with the lower slots of the sleeves, hooks rotatably mounted in said sleeves, and pins carried by said hooks for permanent registration with the upper slots of said sleeves.

2. A hanging seat comprising a hanger including a pair of parallel arms and a cross rod, said arms having a plurality of spaced notches, a pair of hooks, means to rotatably mount the hooks on the upper ends of the hanger arms whereby said hooks may swing in a radius of substantially 180 degrees, slide locks mounted upon the arms for movement lengthwise thereof and provided with means to register with the notches to hold the slide locks in different positions, a seat member, brackets carried thereby for pivotal connection with the slide locks, guides mounted on the underside of the seat member, a brace journalled on the cross rod of the hanger and slidably mounted in the guides for supporting the seat in an elevated position and permitting it to be folded against the hanger, buffers slidably mounted on the cross bar of the hanger, a rest housing mounted on each guide and provided with longitudinal slots, a rest tongue slidably mounted in the housings and set screws having threaded connection with the rest tongue and projecting through the slots in the housings and adapted to be projected into holes in the guides for holding the tongue in different adjusted positions.

3. The combination with a seat including a pair of arms, a seat member, means to adjustably connect the rear portion of the seat member with the arms, and means to support the forward end of said seat member, hooks associated with the upper ends of the arms, sleeves having spaced parallel slots enclosing the meeting ends of the respective arms and hooks, and pins fixed in the arms and hooks and registering with the slots whereby the arms, hooks or sleeves may be rotated independently of each other within the limits of a slot or the hooks in conjunction with the sleeves may be rotated a distance approximately the combined lengths of the slots.

In testimony whereof, I have hereunto affixed my signature.

AUGUSTUS ALBERT WEST.